(12) United States Patent
Park

(10) Patent No.: US 11,584,403 B2
(45) Date of Patent: Feb. 21, 2023

(54) WHEEL DRIVE APPARATUS OF AUTOMATED GUIDED VEHICLE

(71) Applicant: MACPION Corp., Ltd., Incheon (KR)

(72) Inventor: Jae Hyun Park, Incheon (KR)

(73) Assignee: MACPION CORP., LTD., Incheon (KR)

( * ) Notice: Subject to any disclaimer, the term of this patent is extended or adjusted under 35 U.S.C. 154(b) by 182 days.

(21) Appl. No.: 17/065,666

(22) Filed: Oct. 8, 2020

(65) Prior Publication Data

US 2021/0101630 A1 Apr. 8, 2021

(30) Foreign Application Priority Data

Oct. 8, 2019 (KR) .......................... 10-20190124363

(51) Int. Cl.
*B61F 5/52* (2006.01)
(52) U.S. Cl.
CPC ...................................... *B61F 5/52* (2013.01)
(58) Field of Classification Search
CPC ...... B61F 5/52; B61F 3/04; B61F 3/16; B61F 5/325; B60Y 2200/40; B60Y 2200/49; B60Y 2200/60; B60B 35/12; B60B 33/04; B60B 33/0047; B60B 33/0049; B60B 33/0005; A61G 5/043; A61G 5/1089; B60G 7/001; B60G 3/00; B60G 3/02; B60G 5/04; B60G 2204/421; B60G 2206/60; B60G 3/12; B60G 3/207; B62D 61/12; B62D 7/02
See application file for complete search history.

(56) References Cited

U.S. PATENT DOCUMENTS

| 5,445,233 | A  | * | 8/1995  | Fernie   | B60K 1/00  |
|           |    |   |         |          | 180/907    |
| 8,286,738 | B2 | * | 10/2012 | Cheng    | A61G 5/043 |
|           |    |   |         |          | 280/755    |
| 9,010,470 | B2 | * | 4/2015  | Cuson    | A61G 5/10  |
|           |    |   |         |          | 180/907    |
| 9,308,143 | B2 | * | 4/2016  | Bekoscke | A61G 5/1089 |

(Continued)

FOREIGN PATENT DOCUMENTS

JP 6467124 2/2019
KR 10-1982302 5/2019

*Primary Examiner* — Mark T Le
(74) *Attorney, Agent, or Firm* — Lex IP Meister, PLLC

(57) ABSTRACT

A wheel drive apparatus of an automated guide vehicle (AGV) is provided, which includes: a bogie frame; drive frames including a pair of drive wheels installed so that power is transmitted through opposite side surfaces of the bogie frame, and first auxiliary wheels opposite to second auxiliary wheels, with a gap "b" outside of each of the opposite side surfaces of the bogie frame; rotation shaft portions pivotally coupled at shaft points of each of the drive frames and the bogie frame; and connection portions in which first connection arms are respectively formed in the drive frames, and second connection arms are respectively formed in the bogie frame, and the first and second connection arms are vertically connected as a slip rod so as to move up and down at a predetermined gap "a", and thus which does not cause the drive wheel to float in the air even if any of the auxiliary wheels or any of the drive wheels of the AGV travelling along the floor contacts a depression, a barrier and a slope.

1 Claim, 10 Drawing Sheets

(56) References Cited

U.S. PATENT DOCUMENTS

| | | | | |
|---|---|---|---|---|
| 2004/0168839 A1* | 9/2004 | Wu | .......................... | A61G 5/06 |
| | | | | 180/65.1 |
| 2006/0290083 A1* | 12/2006 | Ruiz | ...................... | B60B 33/04 |
| | | | | 280/43.13 |
| 2020/0198947 A1* | 6/2020 | Chow | ....................... | B66F 9/24 |

* cited by examiner when a raised floor is formed at a front auxiliary wheel when a raised floor is formed at a middle drive wheel when a raised floor is formed at a rear auxiliary wheel when raised floors are formed at a front and rear auxiliary wheel

WHEEL DRIVE APPARATUS OF AUTOMATED GUIDED VEHICLE

TECHNICAL FIELD

The present invention relates to a wheel drive apparatus of an automated guided vehicle (AGV) that enables continuous driving without stopping, even if any of drive wheels receiving a driving force between front and rear casters (hereinafter referred to auxiliary wheels) contacts a recessed, protruding or inclined surface of a floor, while driving of the AGV.

BACKGROUND ART

In general, various bogies or trucks for transporting materials, semi-finished products or parts are used in industrial sites such as assembly lines or part processing lines of automobiles.

Recently, automated guided vehicles (AGVs) have been adopted and used in places such as distribution centers where large-scale products are handled. The AGV is an unmanned transport vehicle that enables a bogies or truck to move along a guideline installed on the ground floor or by recognizing a path with a laser scanner sensor, and that transports cargo such as products or parts from one place to another without an operator's direct driving.

In most cases, such an AGV is connected to a conveyor to perform work. In order to receive a product from a conveyor or to deliver a product to a conveyor, the AGV has to accurately stop at a predetermined loading position.

Meanwhile, when any of the drive wheels contact a depression, a barrier, or a sloped floor during driving of such an AGV, the driving of the AGV used to be stopped sometimes.

That is, depending on the surface condition of the floor, any of the drive wheels receiving the driving force between the front auxiliary wheels or the rear auxiliary wheels may float from the floor while the AGV travels, and thus there may be a case in which the AGV may not reach a loading position.

That is, the front and rear auxiliary wheels touch the floor, but the drive wheels located in the middle of the bogie frame may float from the floor. When any of the drive wheels is floating from the floor, the AGV is in a stopped state where it is impossible to drive, resulting in a disruption in the supply of parts for the automated facility as described above.

Meanwhile, in the case of Korean Patent No. 10-1466906, the drive wheel stopped due to the malfunction is raised to separate from the floor, by improving the case where it is impossible to perform driving of the AGV due to the stop of any of the drive wheels when any of the drive wheels is broken, thereby implementing a lifting device that enables the remaining auxiliary wheels to run. It is not desirable to include too many additional devices compared to the field situation of an AGV. In addition, even if the front and rear auxiliary wheels travel on the floor having an inclination, it is required to automatically correct the drive wheels without experiencing any of the drive wheels floating on the floor so that continuous driving is possible without stopping.

As conventional art documents, there are documents of Korean Patent Registration No. 10-1466906 and Korean Laid-open Patent Publication No. 10-2019-0044898.

SUMMARY OF THE INVENTION

Technical Problem

A wheel drive apparatus of an automated guided vehicle (AGV) according to an embodiment of the present invention is to improve the problems of the conventional wheel drive apparatus of the AGV as described above.

It is an object of the present invention to provide a wheel drive apparatus of an automated guided vehicle (AGV) that prevents any of drive wheels from floating in the air even if any of auxiliary wheels or drive wheels of the AGV moving along a predetermined floor as described above contacts a depressed, protruding or inclined floor surface.

Technical Solution

To achieve the above object, a wheel drive apparatus of an automated guided vehicle (AGV) according to an embodiment of the present invention, the apparatus comprises:

a bogie frame including a first end, a second end opposite to the first end, and opposite side surfaces extending between the first and second ends, and forming second auxiliary wheels, respectively at both sides of the second end; drive frames including a pair of drive wheels installed so that power is transmitted through the opposite side surfaces in a driving system installed on the bogie frame, and first auxiliary wheels installed at positions opposite to the second auxiliary wheels; rotation shaft portions each pivotally coupled at shaft points of one of the drive frames and the bogie frame at a state where each of the drive frames is positioned with a gap "b" on the outside of each of the opposite side surfaces of the bogie frame; and connection portions in which, at a state in which each of the drive frames is positioned with the gap "b" on the outside of each of the opposite side surfaces of the bogie frame, first connection arms are respectively formed in the drive frames or on the outsides of the opposite side surfaces of the bogie frame, and second connection arms are respectively formed on the outsides of the opposite side surfaces of the bogie frame or in the drive frames, in which the first connection arms are not formed, and the first and second connection arms are vertically connected as a slip rod so as to move up and down at a predetermined gap "a".

In the wheel drive apparatus of an AGV according to an embodiment of the present invention, the first and second connection arms are configured to form through holes in brackets thereof, respectively, and the through holes are configured to form a bearing and a bushing in any one of the through holes.

In the wheel drive apparatus of an AGV according to an embodiment of the present invention, each of the rotation shaft portions may comprise: a pivot shaft installed through the shaft points of the bogie frame and each of the drive frames; a gap maintaining member installed to maintain the gap "b" between the bogie frame and each of the drive frames; and a fixing nut for fixing the distal end of the pivot shaft.

Advantageous Effects

In the wheel drive apparatus of the AGV according to the embodiment of the present invention, even if any of the front and rear auxiliary wheels or any of the drive wheels contact the depressed, protruding, and inclined floor surface while driving, any of the drive wheels receiving the driving force are not prevented from being in contact with the floor.

The wheel drive apparatus of the AGV according to the embodiment of the present invention may improve the problem of stopping the AGV due to any one of the front and rear auxiliary wheels and the drive wheels in contact with the depression, protrusion, and slope on the floor surface through the connection structure between the drive frames and the bogie frame.

DETAILED DESCRIPTION OF THE INVENTION

Hereinafter, a wheel drive apparatus of an automated guided vehicle (AGV) according to an embodiment of the present invention will be described with reference to the accompanying drawings. Here, the present invention is not limited or restricted by examples. In addition, in describing the present invention, detailed descriptions of known functions or configurations may be omitted to clarify the gist of the present invention.

Known AGVs have auxiliary wheels installed at the front and rear ends and drive wheels at the middle portions.

The drive wheels are installed on opposite side surfaces of the bogie frame, and each receives power from a drive motor.

The drive wheels can also be steered by the power of such a drive motor.

In addition, known AGVs may include a telescopic fork, active weight balance, control computer, etc., and may be transferred in both directions. In addition, known AGVs may include a configuration of lifting cargo up and down, and a configuration and function of actively coping with safety issues that may occur during movement and hoisting in association with a sensor unit that senses a surrounding environment.

That is, through the control computer and the sensor unit, known AGVs may be accompanied by control units capable of controlling the steering lights such as continuous running, stopping, moving straight and turning left and right as electrical signals by detecting the front or floor conditions. In addition, known AGVs may include a power supply unit including a battery, and a frame-shaped structure to assist in transport of a load.

The wheel drive apparatus of an AGV according to the embodiment of the present invention with reference to the above drawings includes: a bogie frame 10; drive frames 20; connection portions 30; and rotation shaft portions 40.

Figure 1:
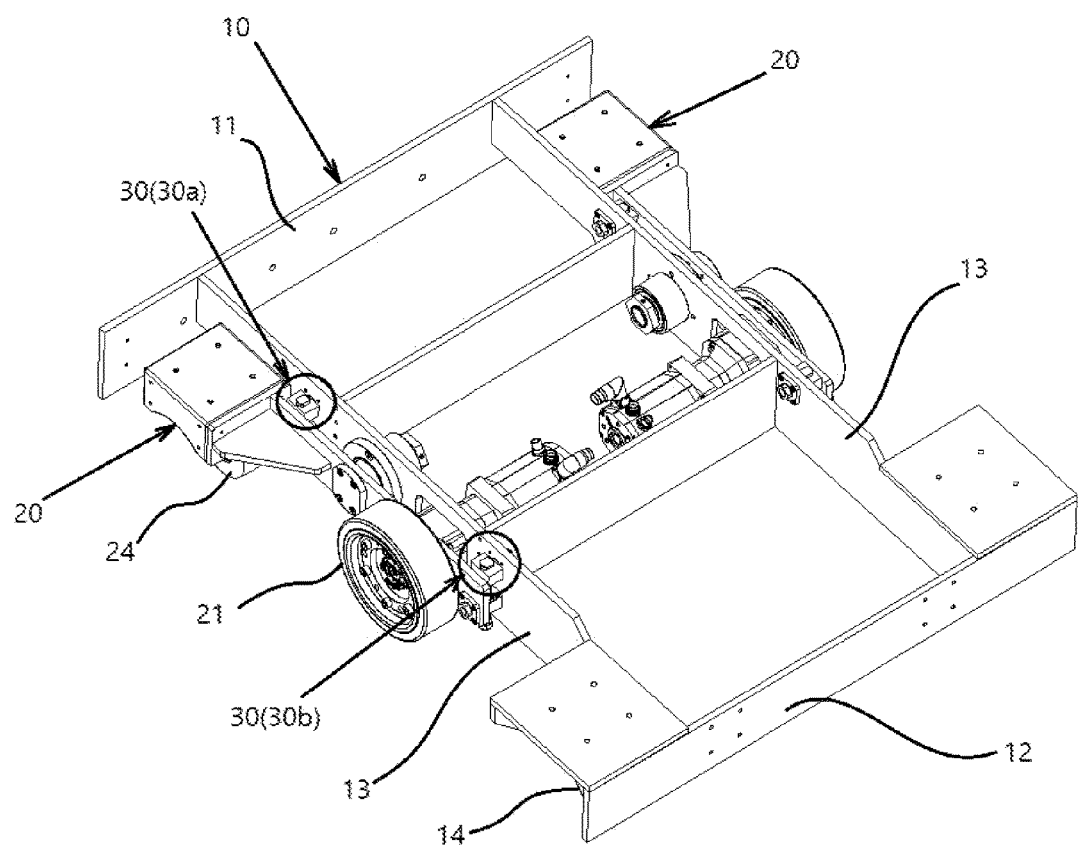
FIG. 1 is an excerpted perspective view of a wheel drive apparatus of an automated guided vehicle (AGV) according to an embodiment of the present invention.
Figure 2:
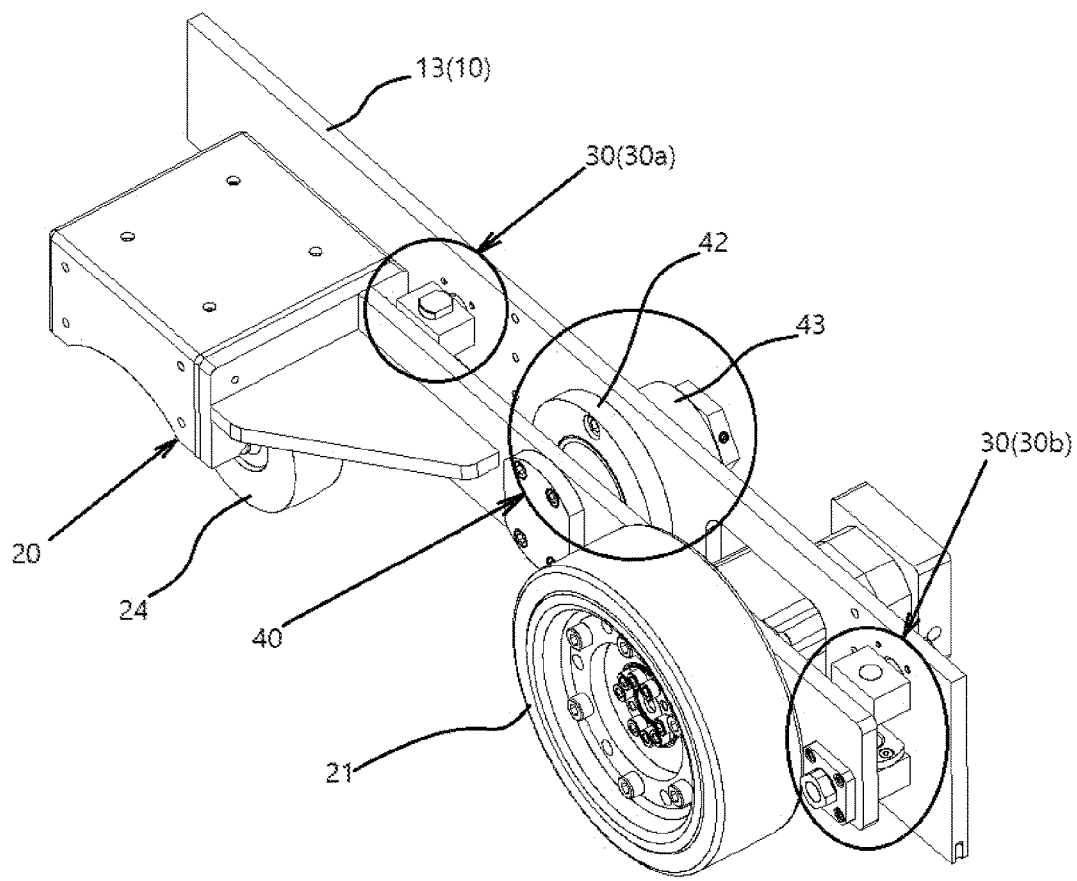
FIG. 2 is an excerpted perspective view of essential parts of one side of a wheel driving apparatus of an AGV according to an embodiment of the present invention.
Figure 3:
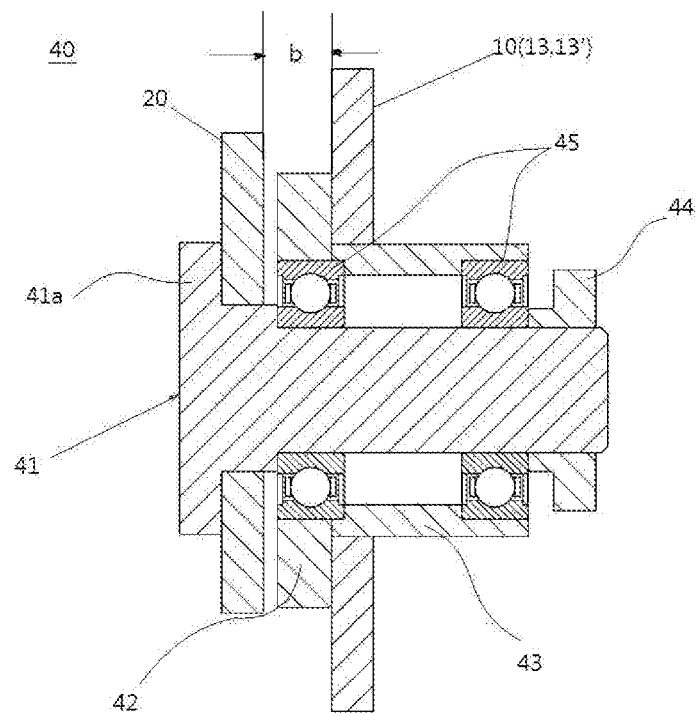
FIG. 3 is a cross-sectional view of a rotation shaft portion of a wheel drive apparatus of an AGV according to an embodiment of the present invention.
Figure 4A:
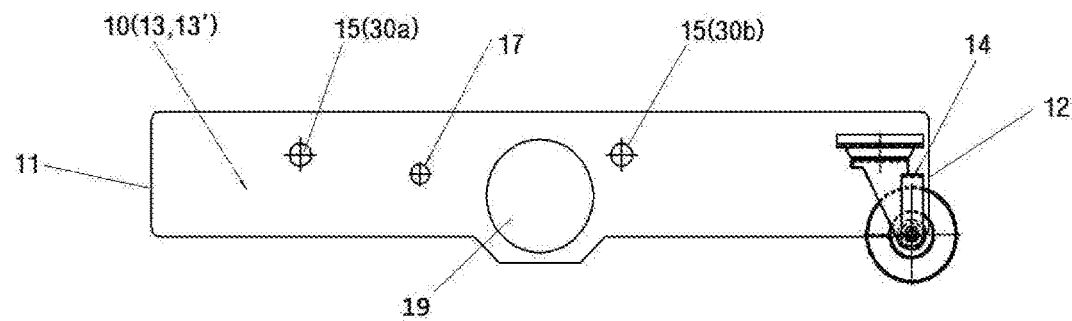
FIG. 4A is a schematic side view of a bogie frame of a wheel drive apparatus of an AGV according to an embodiment of the present invention.
Figure 4B:
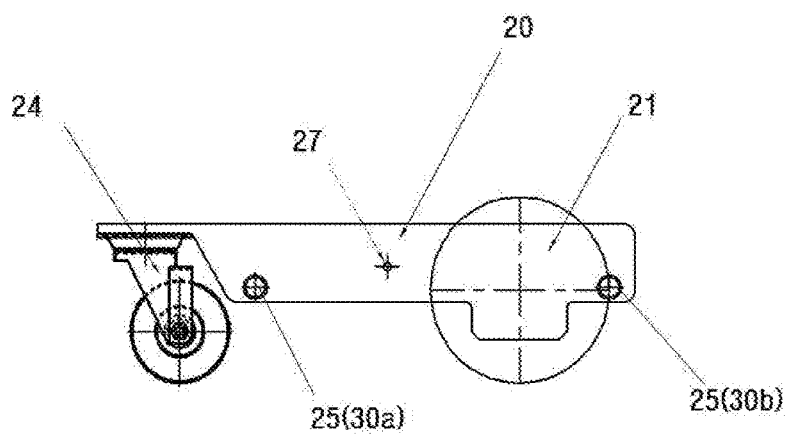
FIG. 4B is a schematic side view of a drive frame of a wheel drive apparatus of an AGV according to an embodiment of the present invention.
Figure 5:
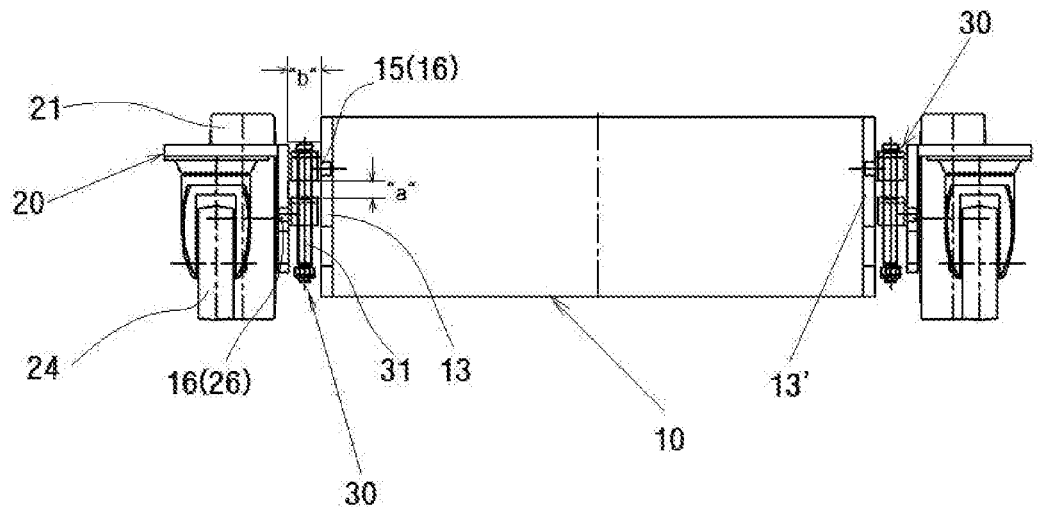
FIG. 5 is a schematic front view illustrating a combined state of a bogie frame and drive frames of a wheel drive apparatus of an AGV according to an embodiment of the present invention.
Figure 6:
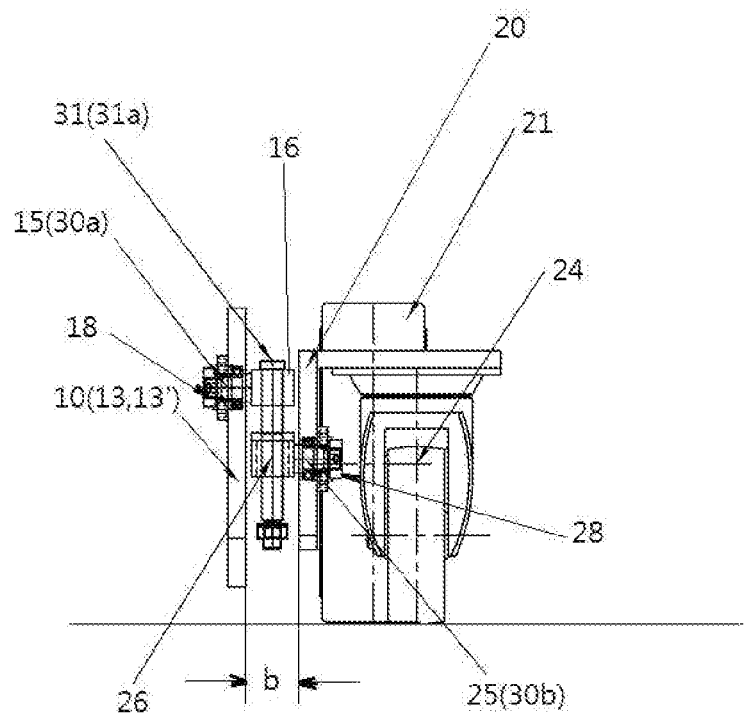
FIG. 6 is a partial enlarged view of essential parts of FIG. 5.

The bogie frame 10 forms a body of the AGV as shown in FIGS. 1, 2 and 4A of the accompanying drawings, and includes: a first end 11 in a first direction; a second end 12 in an opposite direction to that of the first end 11, that is, in a second direction; and opposite side surfaces 13 and 13' respectively extending along both opposite sides between the first and second ends 11 and 12, in which second auxiliary wheels 14 are respectively provided at both sides of the second end 12. A detailed description of the other functional parts constituting the second auxiliary wheels 14 will be omitted.

The bogie frame 10 has opening spaces 19 on and between the opposite side surfaces 13 and 13' so that a driving system (including a power transmission unit such as driving motors, steering parts, etc.) for driving drive wheels 21 is installed and connected therein. In addition, the bogie frame 10 may have a floor formed to carry loads.

As shown in FIGS. 1, 2, 4B and 5 of the accompanying drawings, the drive frames 20 are respectively spaced with a gap "b" from the outsides of the opposite side surfaces 13 and 13' of the bogie frame 10, and installed respectively in parallel with the opposite side surfaces 13 and 13' in the vertical direction. In each of the drive frames 20, a drive wheel 21 and a first auxiliary wheel 24 are installed at the front and rear ends, respectively. A pair of the drive wheels 21 are installed to receive power through respective drive motors (not shown) of the driving system of the AGV described above. The first auxiliary wheel 24 may be installed in the opposite direction (at the rear side) with respect to the second auxiliary wheel 14 installed at the side of the second end of the bogie frame 10. The first and second auxiliary wheels 24 and 14 can be changed in front and rear directions, respectively. In the present invention, it will be described that the first auxiliary wheel 24 is located in the front side and the second auxiliary wheel 14 is located in the rear side.

As shown in FIGS. 1, 2, 3, 4A and 4B of the accompanying drawings, each of the rotation shaft portions 40 may be coupled to shaft points 17 and 27 by a pivot shaft 41 to rotate each drive frame 20 in a state that a gap "b" is maintained outside each of the opposite side surfaces 13 and 13' of the bogie frame 10.

Each of the rotation shaft portions 40 fixes a head portion 41a of the pivot shaft 41 at the shaft point 27 of each of the drive frames 20, and a gap maintaining member 42 or an elastic member may be sandwiched between the bogie frame 10 and each of the drive frames 20 so as to maintain the gap "b" therebetween. A fixing member 43 may be fitted with an exposed end portion of the pivot shaft 41 passing through the shaft point 17 of the bogie frame 10 and fixed with a fixing nut 44. Bearings 45 are respectively inserted inside the gap maintaining member 42 and the fixing member 43 to freely rotate the pivot shaft 41. Accordingly, the bogie frame 10 and each of the drive frames 20 pivoted to the shaft points 27 and 17 may rotate in mutually opposite directions around the pivot shaft 41 fixed to the shaft points 17 and 27.

In each of the connection portions 30, as shown in FIGS. 1, 2, 5, 6, 7, 8A, and 8B of the accompanying drawings, a first connector 30a may be installed at a position close to the first auxiliary wheel 24 of each of the drive frames 20, and a second connector 30b may be installed at a position close to each of the drive wheels 21. Hereinafter, each of the connection portions 30 will be described as the first and second connectors 30a and 30b by distinguishing each of the up and down movement operations during the up and down movement operations. However, in the description of the common operation, it will be described as the connection portions 30 without distinction.

The connection portions 30 may include first connection arms 15 respectively extending from the opposite side surfaces 13 and 13" of the bogie frame 10.

Figure 7:
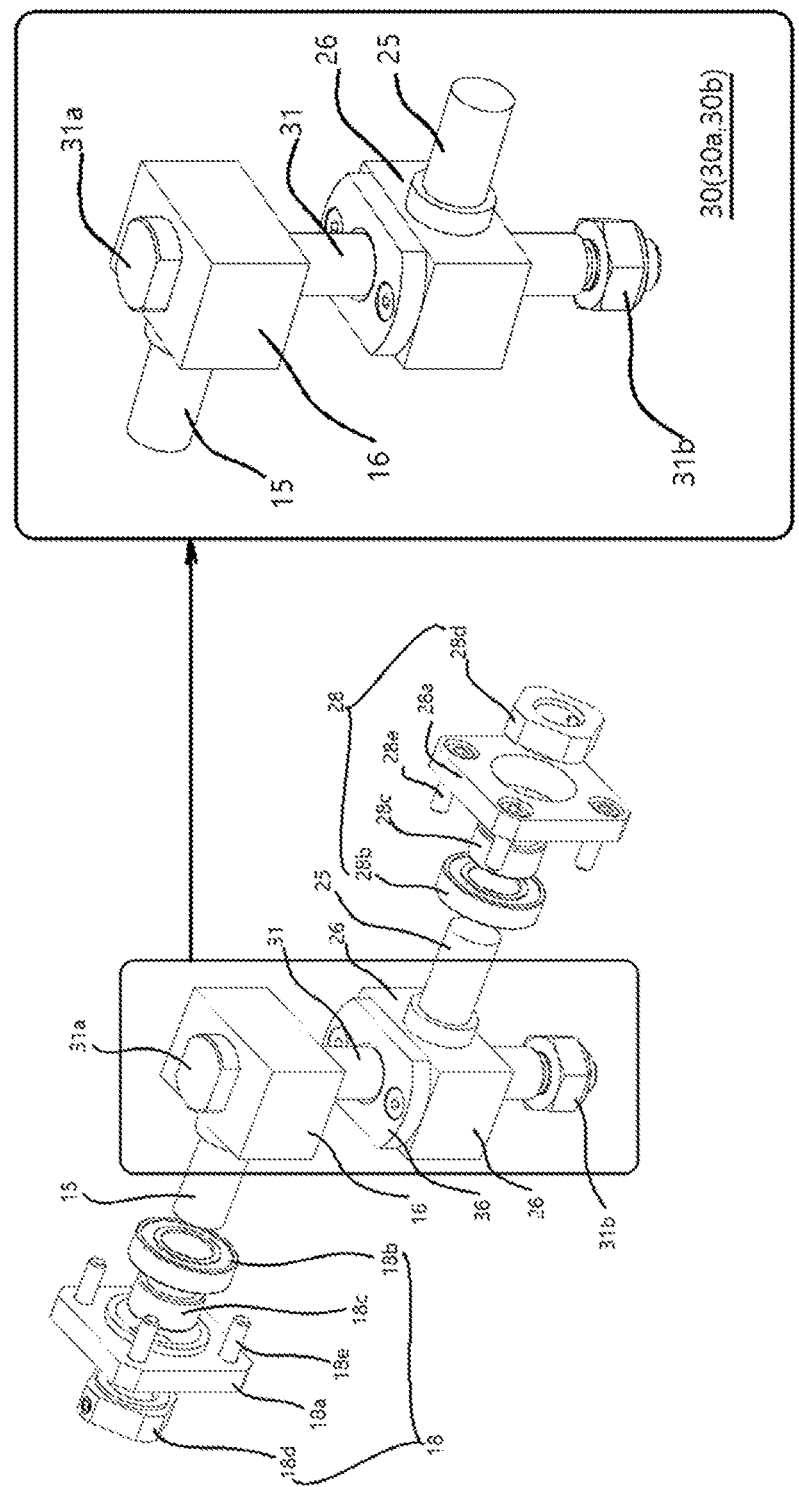
FIG. 7 is an excerpted perspective view of a connection portion of a wheel drive apparatus of an AGV according to an embodiment of the present invention.

Referring to FIG. 7, the first connection arm 15 may be in close contact and fixed to the opposite side surface 13 or 13' of the bogie frame 10 by a close contact member 18a with a bearing 18b and a spacer 18c interposed therebetween so as to be rotatable on the opposite side surface 13 or 13', and may be fixed again by a bearing nut 18d. Accordingly, the first connection arms 15 are substantially vertically rotatable on the opposite side surfaces 13 and 13' of the bogie frame 10.

A second connection arm 25 may be installed at a position close to each of the drive frames 20 by having a height different from that of the first connection arm 15. The second connection arm 25 may be in close contact and fixed to each of the drive frames 20 by a close contact member 28a with a bearing 28b and a spacer 28c interposed therebetween so as to be rotatable on the opposite side surface 13 or 13', and may be fixed again by a bearing nut 28d. Accordingly, the second connection arms 25 can also be rotated vertically in the drive frames 20, respectively.

Figure 8A:
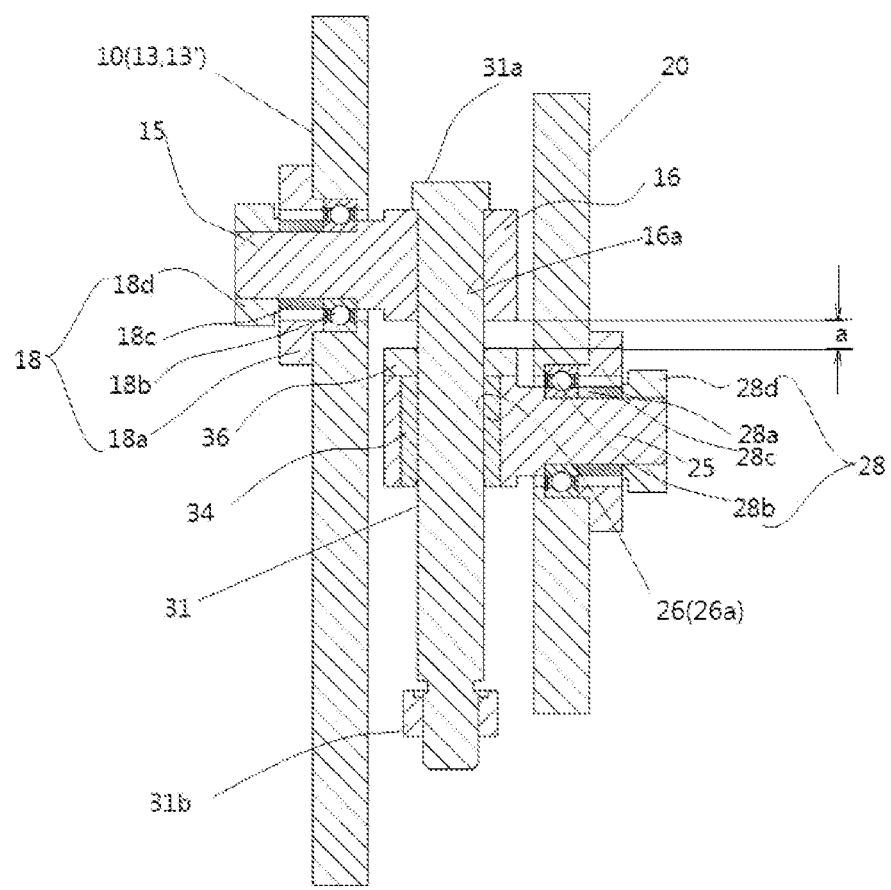
FIGS. 8A and 8B are exemplary cross-sectional views for explaining an operation of a connection portion of a wheel drive apparatus of an AGV according to an embodiment of the present invention.
Figure 8B:
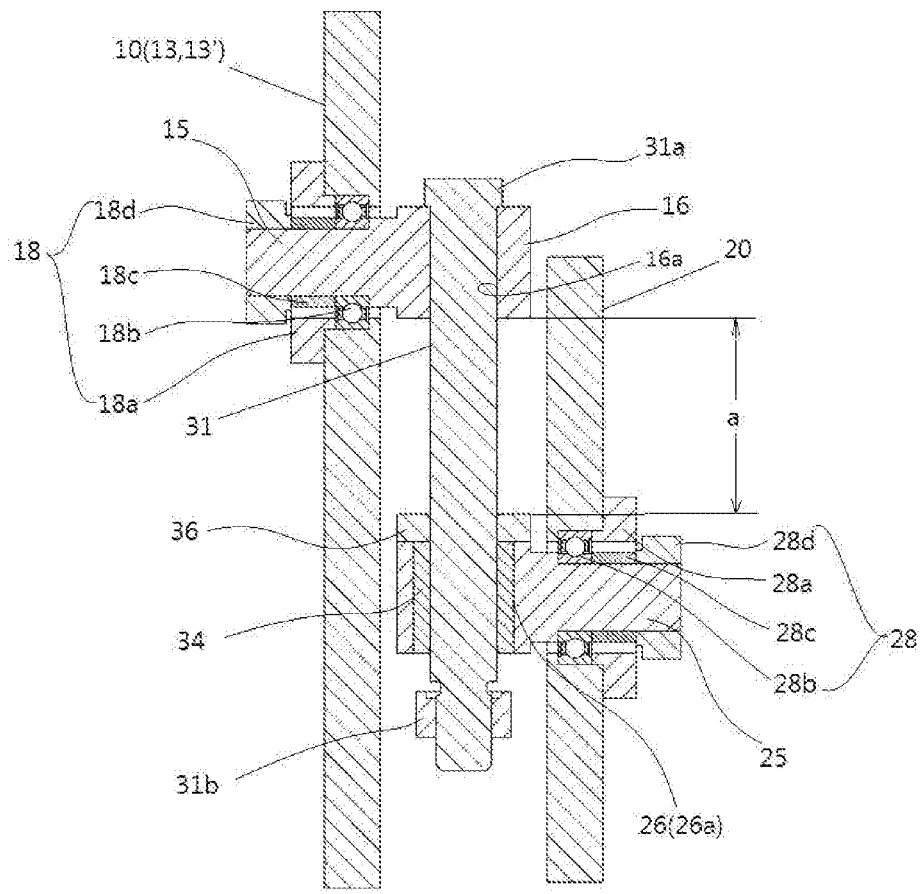

As shown in FIGS. 8A and 8B, the first and second connection arms 15 and 25 are formed in a cantilever shape each having a gap "a" at different heights, and one connection arm moving vertically between the opposite side surface 13 or 13' of the bogie frame 10 and each of the drive frames 20. The gap "b" is formed in a certain range between each of the drive frames 20 and the opposite side surface 13 or 13' of the bogie frame 1. Simultaneously, first and second brackets 16 and 26 may be installed in a vertical direction with one shaft pin 31 (hereinafter referred to as slip rod) so that the one connection arm may slip upward and downward by the gap "a".

That is, the first and second brackets 16 and 26 include inner surfaces provided with circular bores 16a and 26a (hereinafter, referred to as "through holes"), and have a rectangular shape in the drawing. Bushings 34 each forming a slip surface on the inner surface can be respectively inserted into the through holes 16a and 26a of the first and second brackets 16 and 26. Although the bushing 34 is shown only in the through hole 26a of the second connection arm 25 in the drawings, it can also be installed in the through hole 16a of the first connection arm 15.

The bushings 34 are in close contact with the inner surfaces of the first and second brackets 16 and 26, and the inner surfaces of the bushings 34 accommodate the slip rod 31 that slips through the respective through holes 16a and 26a of the first and second brackets 16 and 26, to thereby form circular openings including inner surfaces in sliding contact.

That is, referring to FIGS. 8A and 8B, the second connection arm 25 forms the through hole 26a in which the bushing 34 is embedded in the second bracket 26 at the distal end thereof, and the slip rod 31 is installed to pass through the through holes 26a so that the second connection arm 25 is able to move up and down along the slip rod 31.

The upper part of the slip rod 31 forms an upper head part 31a, and the length of the slip rod 31 can be adjusted as a screw-fit nut 31b, that is, a lower adjustment part at the lower end. In addition, it is possible to form a bearing 36 from the upper side of the through hole 26a of the second bracket 26 toward the inside. Of course, as described above, a bushing, a spacer, a close contact member, etc. may be installed.

The slip rod 31 may be configured to be fixed so as to adjust the length of the slip rod 31 by screwing in the upper and lower ends with fixing nuts (not shown) without the head 31a, and the upper part of the slip rod 31 may further form a slip cap (not shown) for preventing foreign substances.

The bushing 34 may allow vertical slip between the two parts, but has elasticity when made of a special material by casting and may allow a certain amount of left and right movement.

The through hole 26a in which the bushing 34 is installed may vary depending on a specific structural element. That is, in order to increase durability and reliability, the fixing of the bushing may be strengthened by at least one notch and at least one groove. A notch or notches (not shown) may be formed on the outside of the bushing 34, and a groove or grooves (not shown) may be formed in the through hole 26a, to prevent the bushing 34 from being separated. The notches and grooves are not shown in the drawings pertaining to the embodiments of the present invention.

Although not shown differently as described above, the connection portions 30 according to the embodiment of the present invention may include a coil spring (not shown) as an elastic member between the first connection arm 15 and the second connection arm 25. The coil spring may employ a coil spring having a modulus of elasticity adjusted to an appropriate elasticity range in the gap "a" between the upper and lower motions. Such an elastic member may be elastically formed between the bottom surface of the upper bracket 16 and the upper surface of the lower bracket 26 on the slip rod 31. Alternatively, only an elastic member may be installed between the brackets 16 and 26 without the through holes 16a and 26a.

Although not shown in the wheel drive apparatus of an AGV according to the embodiment of the present invention, the connection portions 30 may be changed and introduced to a structure to which a shock absorber is applicable.

Although preferred embodiments of the present invention have been described, those skilled in the art can variously modify or change the present invention.

As shown in FIGS. 7 to 9E, a wheel drive apparatus of an AGV according to an embodiment of the present invention performs the connecting operations of the connection portions 30 to widen or narrow the gap "a" between the upper head part 31a and the lower adjusting part 31b in a state where the inside of each bushing 34 of the first connection arm 15 and the second connection arm 25 is vertically penetrated so as to be moved up and down, to thereby travel smoothly on any of depressions, protrusions and slopes of a floor surface. Here, the drive frames 20 are inclined during travelling on depressed, protruded, and inclined surfaces.

In the description of the wheel drive apparatus of an AGV according to an embodiment of the present invention, each of the connection portions 30 is divided into first and second connectors 30a and 30b as described above, and is able to rotate in the horizontal direction of the bogie frame 10 and each of the drive frames 20 when driving. This allows the first and second connection arms 15 and 25 to rotate horizontally in opposite directions with the slip rod 31 as an axis.

By doing so, the rotational shock applied at the moment the first and second auxiliary wheels 24 and 14 cross an inclined protrusion can be absorbed through the minute free rotation of the first auxiliary wheel 24 or the second auxiliary wheel 14.

Since the wheel drive apparatus of the AGV according to the embodiment of the present invention is configured without making an integration of the bogie frame 10 with the drive frames 20, smooth steering is possible without problems due to unreasonable steering in the driving direction.

The wheel drive apparatus of the AGV according to the embodiment of the present invention will be described with respect to up and down movement operation processes in which driving is smoothly performed without stopping driving when the drive wheels 21, the first auxiliary wheels 24, and the second auxiliary wheels 14 are driving over any of depressions, barriers, and slopes which may be encountered during driving on a floor constituting a horizontal surface.

When both or any one of the first auxiliary wheel 24 and the drive wheel 21 of each of the drive frames 20 drive or drives on an inclined floor of a depression, a barrier, etc., having an inclination, the raised floor undergoes a connection operation that narrows the gap "a" in the vertical direction at any one of the first and second connectors 30*a* and 30*b* or both of the two connectors 30*a* and 30*b*. It shows that even when the bogie frame 10 of the AGV itself remains horizontal, but each of the drive frames 20 encounters an inclination, each of the drive wheels 21 can run while maintaining floor contact without each of the drive wheels 21 floating in the air. This operation is to solve the problem of stopping the driving caused when each of the drive wheels 21 located between the front and rear auxiliary wheels does not touch the floor, which occurs in the case of the conventional AGV without the connection portions 30.

Figure 9A:
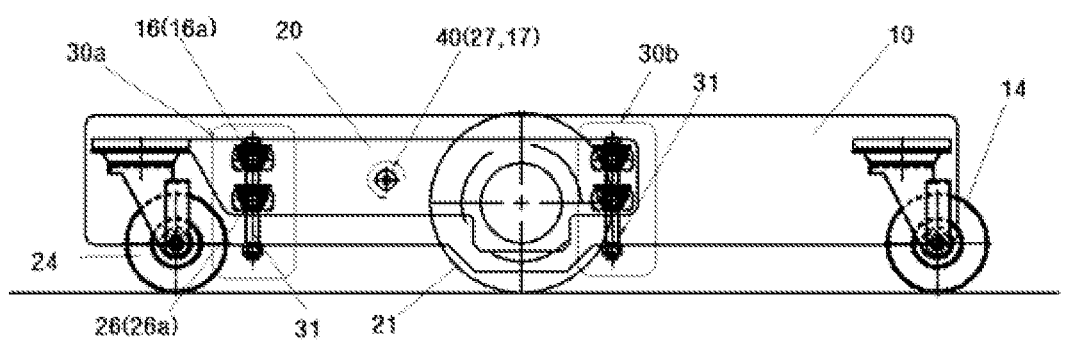
FIGS. 9A to 9E are schematic side views illustrating a driving operation of a wheel drive apparatus of an AGV according to an embodiment of the present invention.

As shown in FIG. 9A, when a floor is in a horizontal state and there are no depressions, barriers and slopes on the floor, both the first and second auxiliary wheels 24 and 14 and each of the drive wheels 21 run while contacting a flat floor at the same time, so the power of the drive wheels 21 acts as drive power as it is, to thus achieve continuous driving. Of course, a known wheel drive apparatus of an AGV can be driven while being steered through the drive wheels 21 at the same time. In the present invention, a description of the steering system of the AGV will be omitted.

Figure 9B:
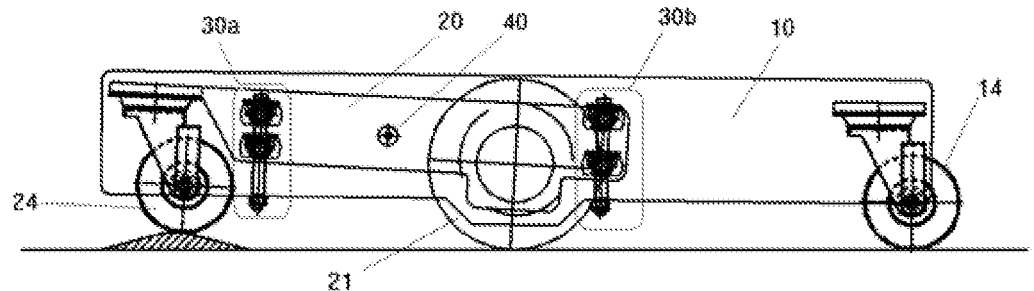

As shown in FIG. 9B, when the first auxiliary wheel 24 travels beyond a protrusion while driving, the first connector 30*a* narrows the gap "a" between the first connection arm 15 and the second connection arm 25, and the drive frame 20 enables the drive wheel 21 to be driven in an inclined state in the floor contact state. Accordingly, even if the first auxiliary wheel 24 is on an elevated floor, the driving state is maintained without stopping the driving by receiving the rotational force through the drive wheel 21.

Figure 9C:
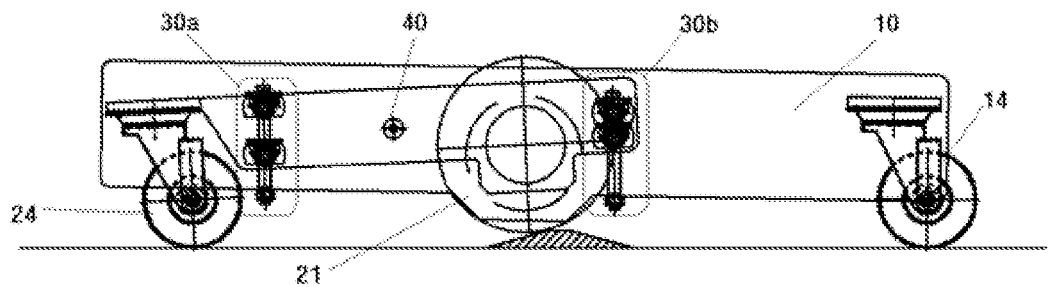

As shown in FIG. 9C, even when the wheel drive apparatus of the AGV of the present invention that was running on the floor drives the drive wheel 21 to run on a raised floor due to a protrusion, the drive frame 20 is inclined between the rear end 12 of the bogie frame 10 and the drive wheel 21 of the drive frame 20, and the gap "a" between the upper first connection arm 15 and the lower second connection arm 25 of the second connector 30*b* narrows. Accordingly, the drive wheel 21 does not float in the air and is in contact with the raised floor while receiving a rotational force so that the driving state can be maintained without stopping.

Figure 9D:
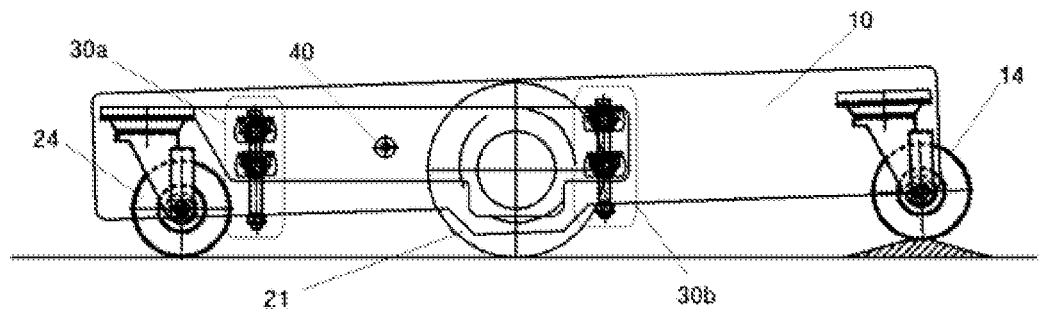

As shown in FIG. 9D, even when the wheel drive apparatus of the AGV of the present invention that was running on the floor drives the second auxiliary wheel 14 to run on a raised floor due to a protrusion, the rear end 12 of the bogie frame 10 and the drive frame 20 are inclined, and the second connector 30*b* narrows the gap "a". Accordingly, since the drive wheel 21 is in contact with the floor, it is possible to travel without idling, so that the wheel drive apparatus of the AGV of the present invention can run without stopping.

Figure 9E:
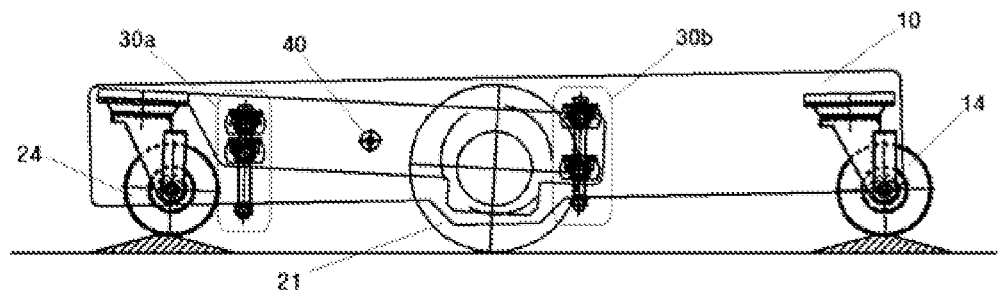

As shown in FIG. 9E, In the case that the wheel drive apparatus of the AGV according to the embodiment of the present invention drives the first auxiliary wheel 24 and the second auxiliary wheel 14 to simultaneously cross over recesses, protrusions, barriers or slopes, a conventional AGV was stopped due to idling of the drive wheel 21 since the drive wheel 21 was floated in the air, but the first connector 30*a* implemented by the wheel drive apparatus according to the embodiment of the present invention narrows the gap "a" so as to act so that the drive frame 20 forms an inclination and the drive wheel 21 contacts the floor. Accordingly, the drive force is transmitted through the drive wheel 21 so that continuous driving is performed without stopping at the moment over the protrusions.

The present invention is to allow the drive wheel to contact the floor in a situation where the drive frame has an inclination toward the front and rear ends while driving, without the problems caused by conventional AGVs, such as stopping the driving of the drive wheel in many situations with such inclination as above, for example, in the case that the drive wheel is floated on the floor, due to the inclined floor surface between the front auxiliary wheel and the drive wheel, or the drive wheel is floated on the floor, due to the inclined floor surface between the rear auxiliary wheel and the drive wheel, that is, without stopping.

Meanwhile, although not shown in the wheel drive apparatus of the AGV according to the embodiment of the present invention, the bushings 34 inserted and installed in the through holes 16*a* and 26*a* in the first and second brackets 16 and 26 of the first and second connecting arms 15 and 25 may have a pair of notches on the outer surfaces thereof, and the first and second brackets 16 and 26 may include corresponding notches on the inner surfaces thereof. These notches can extend the life of the bushings 34 by preventing separation of the bushings 34 by making the relative positions of the bushings 34 and the first and second connecting arms 15 and 25 close. It is possible to form, on the outer surface of the bushings 34, vertical grooves along the inner surfaces of the through holes 16*a* and 26*a* similar to the notches.

As described above, preferred embodiments of the present invention have been described with reference to the drawings, but those skilled in the art will variously modify or change the present invention within the scope not departing from the spirit and scope of the present invention described in the following claims.

What is claimed is:

1. A wheel drive apparatus of an automated guide vehicle (AGV), the apparatus comprising:
   a bogie frame including a first end, a second end opposite to the first end, opposite side surfaces extending between the first and second ends, and second auxiliary wheels installed at both sides of the second end of the opposite side surfaces, respectively;
   drive frames including a pair of drive wheels installed so that power is transmitted through the opposite side surfaces from a driving system installed on the bogie frame, and first auxiliary wheels installed at positions opposite to the second auxiliary wheels, with a gap "b" outside of each of the opposite side surfaces of the bogie frame;

rotation shaft portions pivotally coupled at shaft points of the drive frames and the bogie frame at a state where each of the drive frames is disposed on the outside of each of the opposite side surfaces of the bogie frame; and connection portions in which, at a state in which each of the drive frames is positioned with the gap "b" on the outside of each of the opposite side surfaces of the bogie frame, first connection arms are respectively formed on the outsides of the opposite side surfaces of the bogie frame, and second connection arms are respectively formed on the drive frames, and the first and second connection arms are movably connected to a slip rod so as to move up and down along the slip rod in a predetermined gap "a", wherein brackets of the first and second connection arms are provided with through holes, and a first bearing and a bushing are formed in one of the through holes and wherein the rotation shaft portions each comprise:

a pivot shaft installed through the shaft points of the bogie frame and each of the drive frames;

a gap maintaining member installed to maintain the gap "b" between the bogie frame and each of the drive frames;

a fixing nut fixing the distal end of the pivot shaft; and a second bearing inserted inside the gap maintaining member for rotation of the pivot shaft.

* * * * *